United States Patent Office 3,632,715
Patented Jan. 4, 1972

3,632,715
SURFACE TREATMENT OF ORGANIC POLYMERS
William G. Gowdy, Cherry Hill, N.J., and Joseph W. Keil, Midland, Mich., assignors to Dow Corning Corporation, Midland, Mich.
No Drawing. Division of application Ser. No. 770,121, Oct. 23, 1968, now Patent No. 3,535,145, which is a division of application Ser. No. 507,549, Nov. 12, 1965, now Patent No. 3,453,248, which is a continuation-in-part of application Ser. No. 452,921, May 3, 1965, which in turn is a continuation-in-part of application Ser. No. 405,570, Oct. 21, 1964. This application Mar. 16, 1970, Ser. No. 24,454
Int. Cl. B29g 5/00; B23b 27/00; B44d 1/09
U.S. Cl. 264—136          6 Claims

ABSTRACT OF THE DISCLOSURE

The surface characteristics of vinylic polymers are altered by the application of an organosilicon compound containing at least one HSR'Si— moiety, where R' is a divalent hydrocarbon radical free of aliphatic unsaturation, followed by application of energy. Alternatively, the organosilicon compound can be added to the molten vinylic polymer and this composition is further processed, for example, by extruding into fibers. Exemplary is an acrylonitrile butadiene styrene surface which has been treated with $$\left( \mathrm{HSCH_2CHCH_2Si O_{1/2}} \atop \mathrm{CH_3} \atop \mathrm{CH_3} \right)_{\sim 2} \left( \mathrm{SiO} \atop \mathrm{CH_3} \atop \mathrm{CH_3} \right)_n$$

which exhibits improved lubricity.

---

This application is a divisional of application Ser. No. 770,121, filed Oct. 23, 1968 and now U.S. Patent 3,535,145; which is a divisional of application Ser. No. 507,549, filed Nov. 12, 1965, now U.S. Patent 3,453,248; which is a continuation-in-part of application Ser. No. 452,921, filed May 3, 1965, now abandoned; which in turn is a continuation-in-part of application Ser. No. 405,570, filed Oct. 21, 1964, now abandoned.

This invention relates to a new method of treating the surfaces of solid organic polymers which have been prepared by vinylic polymerization.

The object of this invention is to provide a means for altering the surface characteristics of these polymers. This invention provides a means for making polymer surfaces which are oleophobic, hydrophobic, hydrophilic, receptive to inks and dyes, having high lubricity, or of low lubricity, as desired.

For example, considering the vinylic polymer polyethylene: solvent-resistant containers can be made from polyethylene which has been provided with an oleophobic surface. Polyethylene having an aminofunctional, hydrophilic surface is receptive to permanent printing and dyeing. Additionally, polyethylene sheets can have their surfaces altered so as to have a high coefficient of friction against other treated polyethylene sheets, making the sheets more easily handleable in bulk.

A great number of other applications are possible with this invention, a number of which are described below.

Most broadly, this invention relates to the process of (1) applying to the surface of a solid, vinylic polymer a film comprising a fluid organosilicon compound, free of aliphatic unsaturation, containing at least one HSR'Si— moiety, where R' is a divalent hydrocarbon radical free of aliphatic unsaturation, and (2) applying energy to the surface of said vinylic polymer, whereby said organosilicon compound is irreversibly attached to said vinylic polymer.

Any solid, vinylic polymer is suitable for use in this invention. By "vinylic polymer" is meant any organic polymer which is formed by the polymerization of aliphatically unsaturated carbon-carbon bonds, such as those found in the vinyl group. Examples of such polymers are polyethylene, polypropylene, poly(acrylonitrile-butadiene-styrene), polystyrene, polymethylmethacrylate, poly(acrylonitrile-styrene), polyisobutene, polyvinyl chloride, polyvinylacetate, poly(vinylchloride-vinylidene chloride), and the organic rubber such as natural rubber, ethylene-propylene-cyclohexadiene terpolymer, styrene-butadiene rubber, and butadiene-acrylonitrile rubber.

R' can be any divalent hydrocarbon radical, free of aliphatic unsaturation, such as the methylene, dimethylene, $$\mathrm{-CH-} \atop \mathrm{CH_3}$$

trimethylene, isobutylene $$\mathrm{(-CH_2CHCH_2-)} \atop \mathrm{CH_2}$$

hexamethylene, octadecamethylene, cyclohexylene,

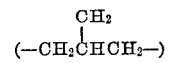, , or

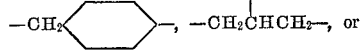

radicals. The isobutylene, trimethylene, and dimethylene radicals are especially desirable.

The organosilicon compound must be "fluid," e.g. it must be a liquid, a vapor, or applied as a solution of an emulsion.

The nature of the organosilicon compound used in this process is not critical, so long as there is at least one HSR'Si— moiety present in the molecule. The nature of the surface produced on the vinylic polymer varies with the type of organosilicon compound used.

For example, the organosilicon compound can be a hydrolyzable organosilane. One embodiment of this invention is the process of (1) applying to the surface of a solid, vinylic polymer a film consisting essentially of a composition selected from the group consisting of (a) silanes of the formula $(\mathrm{HSR'-})_m\mathrm{R}_n\mathrm{SiX}_{4-m-n}$ and partial hydrolyzates thereof, where R is selected from the group consisting of monovalent hydrocarbon and halohydrocarbon radicals free of aliphatic unsaturation, R' is a divalent hydrocarbon radical free of aliphatic unsaturation, $m$ has an average value of 1 to 3, $n$ has an average value of 0 to 2, the sum of $m$ and $n$ being from 1 to 3, and X is selected from the group consisting of the hydroxyl group and hydrolyzable groups free of aliphatic unsaturation; and (2) applying energy to the surface of said vinylic polymer, whereby (a) is irreversibly attached to said vinylic polymer.

R can be any monovalent hydrocarbon or halohydrocarbon radical free of aliphatic unsaturation such as the methyl, ethyl, isobutyl, cyclohexyl, octyl, tetradecyl, octadecyl, phenyl, diphenyl, 2-phenylpropyl, tolyl, 3,3,3-trifluoropropyl, 4-chlorooctyl, bromocyclohexyl, dichlorophenyl, or bromophenyl radicals. Examples of R' are shown above.

More than one type of R or R' group can be found in the silicones used in this invention.

X can be any hydrolyzable group, free of aliphatic unsaturation, known to the art, e.g., alkoxy groups such as methoxy, ethoxy, isopropoxy, hexoxy, or 2-ethylhexoxy; halogen groups such as chlorine or bromine; acyloxy groups such as the formate, acetate, or butyrate groups; ketoxime groups such as

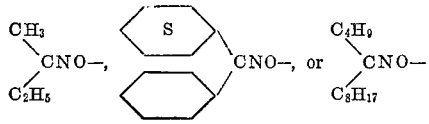

or the isocyanate group.

Examples, therefore, of suitable silanes for use in this invention are

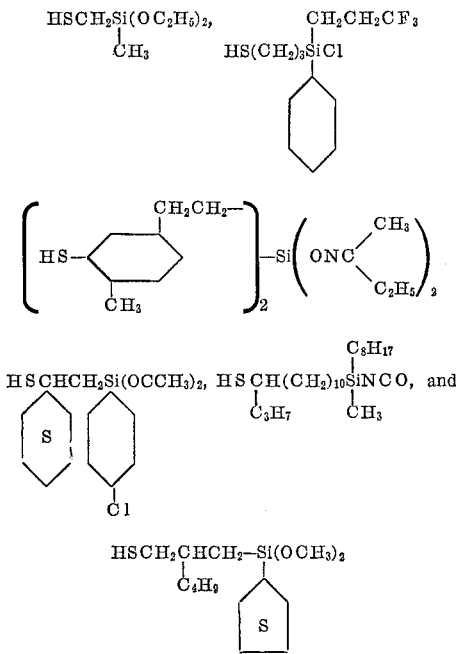

Silanes containing no hydrolyzable groups such as

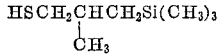

are also usable in this invention to provide a hydrophobic surface.

Energy can be applied to the vinylic polymer surface, in accordance with step (2) of the above-described process, in a number of ways. The method of applying the energy is not critical, though some methods give better results than others.

The vinylic polymer surface can be heated in the absence of air to provide adequate energy to cause the organosilicon compound to permanently bond to the vinylic polymer.

Another preferred method of applying energy is to apply ultraviolet radiation to the solid vinylic polymer surface which has the organosilicon compound thereon. There is a specific ultraviolet dosage for each vinylic polymer-siloxane system that gives the best results for the desired purpose. There is no known way to theoretically calculate this optimum dosage for a given system, but some workable dosages are shown in the examples below. Effective dosages generally lie between 5 and 40 minutes if the organic polymer is 6 inches from a standard ultraviolet lamp.

Other methods of applying energy are through the use of gamma radiation, or peroxide catalysts coupled with heat.

Upon the application of energy to the vinylic surface which is silicone-coated, it is believed that the mercaptan groups on the organosilicon molecules react with linkages in the vinylic polymer in the following manner to form a chemical bond between the polysiloxane and organic polymer:

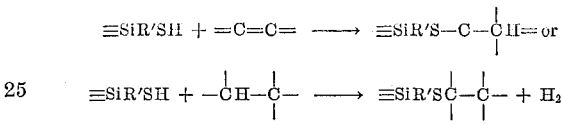

After this reaction, the organosilicon compound is believed to be chemically attached to the vinylic surface so that washing with solvents for the organosilicon compound cannot remove them. Such solvent-washing is a good test for whether or not the silicone is actually bonded to the vinylic polymer.

The process of treating vinylic polymer surfaces with the above-described hydrolyzable silanes finds an important utility as an intermediate step in the preparation of altered surfaces on vinylic polymers. An example of this is the process of (1) applying to the surface of a solid, vinylic polymer a film consisting essentially of a composition selected from the group consisting of (a) silanes of the formula $(HSR'-)_m R_n SiX_{4-m-n}$ and partial hydrolyzates thereof, where R is selected from the group consisting of monovalent hydrocarbon and halohydrocarbon radicals free of aliphatic unsaturation, R' is a divalent hydrocarbon radical free of aliphatic unsaturation, $m$ has an average value of 1 to 3, $n$ has an average value of 0 to 2, the sum of $m$ and $n$ being from 1 to 3, and X is selected from the group consisting of the hydroxyl group and hydrolyzable groups free of aliphatic unsaturation, (2) applying energy to the surface of said vinylic polymer, whereby (a) is irreversibly attached to said vinylic polymer, and (3) applying to the same surface of said vinylic polymer a film of (b) a composition selected from the group consisting of

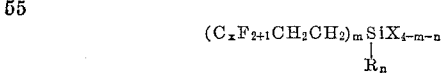

and partial hydrolyzates thereof,

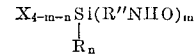

and partial hydrolyzates thereof, silicic acid, and partial condensates of silicic acid, where R" is any alkylene radical of no more than 4 carbon atoms, $x$ is a positive integer, Q is selected from the group consisting of hydrogen and —R"NH$_2$ groups, and the other symbols are as defined above.

R" can be any alkylene group as described above, such as methylene, dimethylene, trimethylene, and

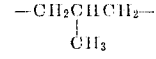

These materials of (b) above as believed to react with the hydrolyzable groups of the mercapto silanes of (a), thereby being bonded to the surface of the vinylic polymer. The materials of (a) and (b) can be added to the vinylic polymer simultaneously, if desired, preferably in proportions of 1 to 75 mol percent of (a) and 25 to 99 mol percent of (b).

The compositions of the formula

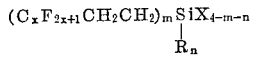

and their partial hydrolyzates, impart oleophobicity to the vinylic polymer surface when applied in the manner described above. $x$ preferably has a value of 4 to 14.

The compositions of the formula

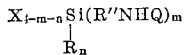

and their partial hydrolyzates, render the vinylic polymer surface hydrophilic. Water-soluble dyes, inks, and printing pastes, such as polyamide resins that contain pigments, can be permanently affixed to such a treated surface, making possible the dyeing of thermoplastic fibers and printing on thermoplastic sheets.

Finally, silicic acid and the partial condensates thereof dry on the polymer to produce what is essentially a silica surface bonded to the vinylic polymer. This increases the coefficient of friction of the vinylic polymer, which is useful where sliding is undesirable.

Another useful additive to the mercaptosilane-treated surface of a vinylic polymer is a polyglycol which is endblocked with a functional group that reacts with the hydrolyzable groups on the vinylic polymer surface. Hydrophilic or slightly hydrophobic surfaces can be produced in this manner.

Catalysts can be used to accelerate the reaction of the above materials with the mercaptosilane-treated surface if desired, e.g., KOH, FeCl$_3$, stannous octoate, trihexylamine, and other known catalysts for the hydrolysis and condensation of silanes that contain hydrolyzable groups.

The term "applying to the surface" carries with it the requirement that the organosilicon compound so applied should be found on the surface in detectable amounts, e.g. as a film of polysiloxane.

The organosilicon ingredient can be applied to the vinylic polymer surface in a direct or an indirect manner; in other works, not only can the organosilicon ingredient be directly applied by conventional means to the surface of the vinylic polymer, but it can also be added to the molten vinylic polymer so that it is dispersed therein. This latter technique is particularly useful with saturated hydrocarbon polymers, e.g. polypropylene.

A particularly useful product of this latter technique is a composition consisting essentially of a mixture of (a) 100 parts by weight of a thermoplastic, saturated vinylic polymer and (b) from 0.01 to 1.4 parts by weight of an organosilicon compound selected from the group consisting of silanes of the formula (HSR'—)$_m$R$_n$SiX$_{4-m-n}$ and partial hydrolyzates thereof, where R is selected from the group consisting of monovalent hydrocarbon and halohydrocarbon radicals free of aliphatic unsaturation, R' is a divalent hydrocarbon radical free of aliphatic unsaturation, $m$ has an average value of 1 to 3, $n$ has an average value of 0 to 2, the sum of $m$ and $n$ being from 1 to 3, and X is selected from the group consisting of the hydroxyl group and hydrolyzable groups free of aliphatic unsaturation.

It has been found that these compositions are surface-reactive in the manner of the various mercaptoalkylsilane-coated, saturated polymers shown above, and that surface properties similar to those shown above can be attained. These compositions also tend to have higher heat distortion temperatures and more resistance to cold flow than their mercaptoalkylsilane-free counterparts. They also appear to exhibit other improvements in physical properties as well as those mentioned above.

The above compositions can be utilized to make dyeable fibers by the process of (1) Extruding one of the above mercaptoalkylsilane-containing vinylic polymers into fibers and (2) Applying to said fibers a water dispersion containing from 0.1 to 50 weight percent of a priming composition selected from the group consisting of colloidal silica, a silane of the formula

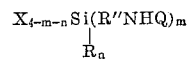

and partial hydrolyzates of said silane, where R is selected from the group consisting of monovalent hydrocarbon and halohydrocarbon radicals free of aliphatic unsaturation, R'' is an alkylene radical of no more than 4 carbon atoms, X is selected from the group consisting of the hydroxyl group and hydrolyzable groups, Q is selected from the group consisting of hydrogen and —R''NH$_2$ groups, $m$ has an average value of 1 to 3, and $n$ has an average value of 0 to 2, the sum of $m$ and $n$ being from 1 to 3, whereby a dyeable fiber is produced.

Examples of the various symbols and ingredients are shown above.

It should be noted that the aminoalkylsilane or its hydrolyzates, which must be present in order to render the fiber dyeable, must be applied within a few minutes or hours after preparation of the mercaptoalkylsilane-containing vinylic polymer. If this does not happen, the vinylic polymer will often become nonadherent to the aminoalkylsilane and therefore not permanently dyeable.

Alternatively however, a dispersion of colloidal silica can be applied to the silane-containing vinylic polymer. The vinylic polymer will then remain adherent indefinitely toward all organosilicon compounds which contain silanol or hydrolyzable groups, including the aminoalkyl silanes used herein. The mercaptoalkylsilicone-containing fibers can therefore be stored for a long time and/or heated without the problem of degradation of the aminoalkylsilane primer on its surface. They can then be later treated with the aminoalkylsilane and dyed.

The preferred vinylic polymers for making fibers as described above are polyethylene, polypropylene, and copolymers thereof.

The above process can be commercially exploited by adding the mercaptoalkylsilane ingredient, or its hydrolyzate, to the molten hydrocarbon polymer prior to extrusion, and by placing the colloidal silica or the aminoalkyl silicone into the quenching bath into which the fibers are immediately drawn after extrusion. Only a few minor modifications are therefore required to adapt the presently existing production lines for hydrocarbon polymer fibers to perform the process of this application.

Another embodiment of this invention is the process of (1) applying to the surface of a solid, vinylic polymer a film of a fluid siloxane polymer having a viscosity of at least 45 cs. at 25° C., which consists essentially of (a) (R$_n$SiO$_{4-n/2}$) units and (b) [HSR'—)$_m$R$_k$SiO$_{4-m-k/2}$] units, where R is selected from the group consisting of monovalent hydrocarbon and halohydrocarbon radicals free of aliphatic unsaturation, R' is a divalent hydrocarbon radical, free of aliphatic unsaturation, $n$ has an average value of from 1.8 to 2.2, $m$ has an average value of 1 to 3, and $k$ has an average value of 0 to 2, the sum of $m$ and $k$ being no more than 3, and there being an average of at least 2 (b) units and at least 5 times as many (a) units as (b) units per siloxane polymer molecule; and (2) applying energy to the surface of the organic polymer, whereby the siloxane polymer is attached to the vinylic polymer surface, forming a permanent lubricant thereon.

By "permanent" it is meant that siloxane coating cannot be washed off the vinylic polymer with a solvent for the siloxane without also removing the outer surface of the organic polymer.

The fluid siloxane polymer generally needs a viscosity of at least 45 ca. at 25° C. in order to keep from soaking into the organic polymer, thereby leaving the polymer surface, but some organic polymers, lower viscosity siloxanes can be used.

The upper viscosity limit of the siloxane is not critical, the only requirement being that the siloxane be spreadable on the organic polymer. It is preferred, however, for the siloxanes used to have a viscosity of below 5000 ca. at 25° C.

It is also preferable in this case for the organic polymer to be an organic rubber, examples of which have been given above. Examples of R and R' are also shown above.

The preferred siloxane is a linear dimethylsiloxane polymer with

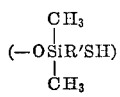

groups as endblocking units.

It is also especially preferred for the siloxanes used to have viscosities of 100 to 1,000 ca. at 25° C.

A preferred method of applying energy to mercapto-siloxane-treated polymers is to heat the organic polymer, preferably rubber, to the vulcanizing temperature in a mold, using the polysiloxane of this invention as a mold release fluid. The resulting product is a vulcanized, molded article with permanent lubricity on its surface due to the fact that at least some of the siloxane is bonded to the organic polymer.

Little difficulty with the silicone concentration will be encountered if it is placed on the vinylic polymer in pure, undiluted form; however, solutions and emulsions can often be used to apply the silicone to the vinylic polymer surface.

The mercaptosilicones of this invention are generally known to the art, and can be made in a number of ways.

Mercapto-endblocked polysiloxanes can be made by equilibrating cyclic polysiloxanes containing the desired R groups with a mercapto-disiloxane of the formula

in the presence of an acid clay catalyst, where the symbols are as defined above.

The above-mercapto-disiloxanes can be made by hydrolyzing the appropriate mercapto-silane containing a silicon-bonded hydrolyzable group such as the chlorine group.

Another way of making mercapto-endblocked polysiloxanes is to react hydroxyl-endblocked polysiloxanes containing the desired R groups with a compound of the formula

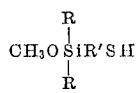

where R and R' are defined above, in the presence of stannous octoate. Methanol is evolved as a byproduct.

A way of making any mercapto-siloxane used in this invention is to cohydrolyze silanes containing only r groups and hydrolyzable groups with silanes containing —R'SH groups, or to equilibrate cyclic siloxanes containing only R groups with polysiloxanes containing —R'SH groups.

The mercaptosilanes, which can be used by themselves or which can be used to make the mercaptosiloxanes of this invention, can be made as follows: when it is desired for the mercapto group to be separated from the Si atom by 1 or 3 carbon atoms, the appropriate terminal chloroalkyl compound can be reacted with NaSH e.g.:

When it is desired for 2, 4 or more carbon atoms to separate the mercapto group from the silicon atom, the appropriate terminal olefin can be reacted with thioacetic acid, e.g.

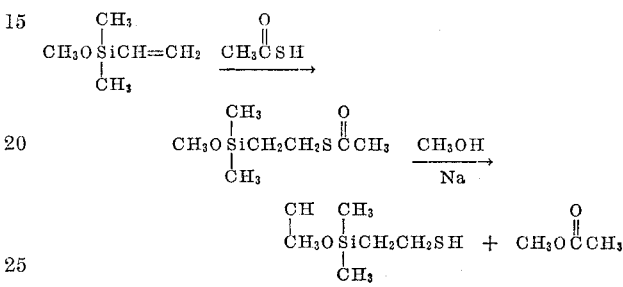

Other known methods also exist for making the above silanes.

The following examples are illustrative only and should not be construed as limiting the invention which is properly delineated in the appended claims.

EXAMPLE 1

The following rubber formulation was prepared in parts by weight:

|  | Parts |
|---|---|
| Styrene-butadiene rubber stock | 23.8 |
| Polybutadiene rubber stock | 16.2 |
| High surface area silica | 20.2 |
| Zinc oxide | 1.7 |
| Coumarone-indene resin | 3.4 |
| Sulfur | 0.8 |
| Stearic acid | 0.34 |
| "Altax" rubber additive | 0.4 |
| "Methyl Tuads" additive | 0.07 |

A polysiloxane of the formula

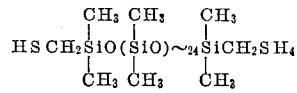

having a viscosity of about 50–60 cs. at 25° C., was used in the following experiment.

The lubricity of the rubber samples was tested by the "Crock test" where a ½ inch ball bearing is rubbed back and forth in a 6 inch path at about 60 strokes per minute, the weight of the ball bearing on the rubber being 1.5 pounds. The time of failure is the time until the rubber begins to crack and abrade.

(a) The above rubber formulation was vulcanized for 45 minutes at 160° C. and 5,000 p.s.i. It was then wiped with isopropyl alcohol. After 5 minutes of the Crock test, the rubber showed severe abrasion.

(b) The above rubber formulation was vulcanized as in (a), and then the polyniloxane was applied. The treated rubber withstood 4 hours on the Crock tester without abrasion. However, similarly treated rubber was cleaned with isopropyl alcohol and tested on the Crock tester. After 5 minutes, there was severe abrasion.

(c) The above rubber formulation was vulcanized as in (a), but the polysiloxane was used as a mold release agent. The vulcanized rubber was cleaned with isopropyl alcohol and tested on the Crock tester. After 4 hours there was moderate abrasion on the rubber.

(d) The above rubber formulation was vulcanized for 1 hour at 175° C. and 5,000 p.s.i., using the above siloxane as a mold release agent. The vulcanized rubber was cleaned with isopropyl alcohol and treated on the Crock tester. After 4 hours there was no abrasion on the rubber.

a mold release agent, the polymer containing about 150 dimethylsiloxane units. The rubber samples were then washed with isopropyl alcohol.

The lubricity and strength characteristics of each sample follow:

TABLE

| Rubber | Treatment | Durometer | Tensile (p.s.i.) | Elongation, percent | Crock test time to failure |
|---|---|---|---|---|---|
| Natural | None | 81 | 2,060 | 510 | 30 sec. |
| Do | Siloxane mold release | 85 | 2,010 | 500 | 4 hr. 30 min. |
| Ethylene propylene cyclohexadiene | None | 91 | 3,260 | 510 | 30 sec. |
| Do | Siloxane mold release | 90 | 3,180 | 500 | >24 hr. |
| Styrene-butadiene rubber mixed with polybutadiene | None | 87 | 2,515 | 520 | 1 min. |
| Do | Siloxane mold release | 88 | 2,550 | 510 | 12 hrs. |
| Butadiene-acrylonitrile (high nitrile) | None | 97 | 3,550 | 285 | 2 min. |
| Do | Siloxane mold release | 97 | 3,450 | 290 | 8 hrs. |
| Butadiene-acrylonitrile (low nitrile) | None | 83 | 3,860 | 400 | 1 min. |
| Do | Siloxane mold release | 85 | 3,680 | 410 | >24 hrs. |
| Butyl | None | 88 | 1,850 | 650 | 20 sec. |
| Do | Siloxane mold release | 87 | 1,800 | 675 | 40 min. |
| Styrene-butadiene rubber | None | 84 | 2,910 | 500 | 45 sec. |
| Do | Siloxane mold release | 85 | 3,000 | 535 | 35 min. |

(e) The rubbers of (a) and (c) were tested for their physical characteristics with the following results:

| Rubber | Durometer | Tensile strength at break point | Elongation percent |
|---|---|---|---|
| (a) | 80 | 2,650 | 530 |
| (c) | 85 | 2,880 | 700 |

EXAMPLE 3

Standard formulations of the following rubbers were vulcanized as in Example 2 with the polysiloxanes shown below used as mold release agents. The polysiloxanes and rubbers used, and the lubricity obtained, as shown below. The samples were washed in isopropyl alcohol before testing in the Crock tester (described in Example 1).

TABLE

| Rubber | Siloxane Polymer | Crock test time to failure |
|---|---|---|
| (a) Styrene-butadiene rubber mixed with polybutadiene. | $HSiO(SiO)_nSiH$ with $CH_3$ groups | 100 cs. at 25° C.[1] — 4 hrs. |
| (b) Styrene-butadiene rubber mixed with polybutadiene. | $HSCH_2SiO(SiO)_{\sim 20}SiCH_2SH$ with $CH_3$ groups | 52 cs. at 25° C. — 12 hrs. |
| (c) Styrene-butadiene rubber mixed with polybutadiene. | $HSCH_2SiO(SiO)_{\sim 150}SiCH_2SH$ with $CH_3$ groups | 400 cs. at 25° C. — 12 hrs. |
| (d) Ethylene-propylene-cyclohexadiene terpolymer. | The siloxane of (a) | 1 hr. |
| (e) Ethylene-propylene-cyclohexadiene terpolymer. | The siloxane of (c) | >24 hrs. |
| (f) Styrene-butadiene rubber | The siloxane of (a) | 1 min. |
| (g) Styrene-butadiene rubber | The siloxane of (b) | 1 hr. |
| (h) Styrene-butadiene rubber | The siloxane of (c) | 1 hr. |
| (i) Styrene-butadiene rubber | $(HSCH_2CHCH_2SiO_{1/2})_2(SiO)_{\sim 150}$ with $CH_3$ groups | 400 cs. at 25° C. — 3 hrs. |
| (j) Butadiene-acrylonitrile rubber (low nitrile). | The siloxane of (a) | 3 hrs. |
| (k) Butadiene-acrylonitrile rubber (low nitrile). | The siloxane of (b) | >24 hrs. |
| (l) Butadiene-acrylonitrile rubber | The siloxane of (c) | >24 hrs. |

[1] This is a comparison run. It and the others below show the superiority of mercaptosiloxanes to a siloxane containing the SiH functional group.

EXAMPLE 2

Standard formulations of the following rubbers were prepared. Samples of each were vulcanized for 45 minutes at 160° C. and 5,000 p.s.i., and with one sample of each rubber a mercaptomethyl-endblocked dimethylpolysiloxane with a viscosity of 400 cs. at 25° C. was used as

EXAMPLE 4

The following vulcanized rubber samples were thinly coated with mercapto-siloxanes and treated with ultraviolet light from a standard U.V. lamp. The irradiated products were washed in isopropyl alcohol and tested by the Crock test of Example 1. The results follow:

TABLE

| Rubber | Siloxane used | Irradiation | Crock test time to failure |
|---|---|---|---|
| (a) Natural | None | None | 20 sec. |
| (b) Natural | $(HSCH_2CHCH_3SiO_{1/2})_2(SiO)_n$ with $CH_3$ groups, 440 cs. at 25° C | 5 min. of ultraviolet, 6 in. from U.V. source. | 15 min. |
| (c) Natural | The siloxane of (b) | 15 min. of ultraviolet, 6 in. from U.V. source. | 4 hrs. |
| (d) Natural | $(HSCH_2SiO_{1/2})_2(SiO)_n$ with $CH_3$ groups, 51 cs. at 25° C | 15 min. of ultraviolet, 6 in. from U.V. source. | 4 hrs. |
| (e) Styrene-butadiene rubber | None | None | 45 sec. |
| (f) Styrene-butadiene rubber | The siloxane of (b) | 15 min. of ultraviolet, 6 in. from U.V. source. | 5 min. |
| (g) Styrene-butadiene rubber | The siloxane of (b) | 30 min. of ultraviolet, 6 in. from U.V. source. | 30 min. |
| (h) Ethylene propylene-cyclohexadiene terpolymer | None | None | 30 sec. |
| (i) Ethylenepropylene cyclohexadiene terpolymer | The siloxane of (b) | 15 min. of ultraviolet, 6 in. from U.V. source. | 10 min. |
| (j) Ethylenepropylene cyclohexadiene terpolymer | The siloxane of (b) | 30 min. of ultraviolet, 6 in. from U.V. source. | >16 hrs. |
| (k) Ethylenepropylene cyclohexadiene terpolymer | The siloxane of (d) | 30 min. of ultraviolet, 6 in. from U.V. source. | 1 hr. |
| (l) Styrene-butadiene rubber with polybutadiene | None | None | 1 min. |
| (m) Styrene-butadiene rubber with polybutadiene | The siloxane of (b) | 15 min. of ultraviolet, 3 in. from U.V. source. | 5 min. |
| (n) Styrene-butadiene rubber with polybutadiene | The siloxane of (b) | 30 min. of ultraviolet, 3 in. from U.V. source. | 1 min.[1] |
| (o) Styrene-butadiene rubber with polybutadiene | The siloxane of (b) | 30 min. of ultraviolet, 6 in. from U.V. source. | 30 min. |
| (p) Styrene-butadiene rubber with polybutadiene | The siloxane of (b) | 1 hr. of ultraviolet, 6 in. from U.V. source. | 2 min.[1] |
| (q) Butyl | None | None | 20 sec. |
| (r) Butyl | The siloxane of (d) | 30 min. of ultraviolet, 6 in. from U.V. source. | 1 min.[2] |

[1] This indicates that there has been an overdose of ultraviolet.
[2] The pull needed to remove Scotch tape from the rubber of (q) was 750 gms. The pull needed to remove Scotch tape from the rubber of (r) was about half of this: 400 gms. This clearly indicates the presence of a surface lubricant.

EXAMPLE 5

Steel panels primed with $(CH_3O)_3SiCH_2CH_2CH_2NHCH_2CH_2NH_2$ were bonded to films of polyethylene or acrylonitrile-butadiene styrene which were 3 to 5 mils thick.

To the thermoplastic faces of these panels there were added films of the mercapto-siloxanes shown below, and the panels were irradiated with ultraviolet light. They were then wiped with isopropyl alcohol and tested to failure in the Crock test of Example 1.

The results follow:

EXAMPLE 6

When natural rubber is coated with a fluid polysiloxane consisting essentially of 40 mol percent

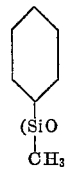

units, 55 mol percent

TABLE

| Substrate | Siloxane used | Irradiation | Crock test time to failure |
|---|---|---|---|
| (a) Polyethylene | None | None | 1 min. |
| (b) Polyethylene | Dimethylpolysiloxane | 350 cs. at 25° C do | 5 min. |
| (c) Polyethylene | $(HSCH_2CHCH_3SiO_{1/2})_{\sim 2}(SiO(CH_3)_2)_n$ with $CH_3$ groups | 440 cs. at 25° C do | 5 min. |
| (d) Polyethylene | The siloxane of (c) | 5 min. of U.V. light, 6 in. from U.V. source. | 10 min. |
| (e) Polyethylene | The siloxane of (c) | 15 min. of U.V. light, 6 in. from U.V. source. | 35 min. |
| (f) Acrylonitrile-butadiene styrene | None | None | 5 min. |
| (g) Acrylonitrile butadiene styrene | The siloxane of (c) | 15 min. of U.V. light, 6 in. from U.V. source. | 22 min. | units, and 5 mol percent [HSC$_6$H$_{10}$)$_3$SiO$_{1/2}$] units, there being an average of 2 mercaptosiloxy groups per molecule, a rubber possessing permanent lubricating characteristics at its surface is formed on exposure of the coated rubber to about 2 megarads of gamma radiation in the period of an hour.

EXAMPLE 7

When crystalline polypropylene resin is coated with a fluid polysiloxane consisting essentially of approximately 69 mol percent

units, 25 mol percent

units, 1 mol percent (CH$_3$SiO$_3$/$_2$ units, 2 mol percent

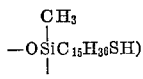

units and 3 mol percent

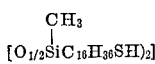

units, having a viscosity of 5,000 cs. at 25° C., and when this coated resin is heated at 150° C. with infrared radiation in argon gas for one hour, a permanent lubricating coating on the surface of the resin is formed.

EXAMPLE 8

When solid ethylene-vinyl acetate copolymer is coated with a fluid polysiloxane of the average formula

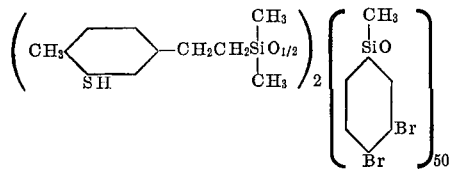

and exposed to ultraviolet light for 20 minutes at a 6 inch distance from the U.V. source, the resin acquires permanent lubricity.

EXAMPLE 9

When polystyrene resin is coated with a fluid polysiloxane of the average formula

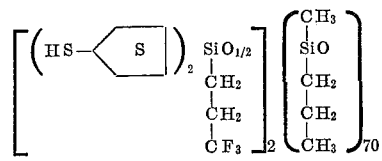

and exposed to 30 minutes of ultraviolet light at a 6 inch distance from the U.V. source, the resin acquires permanent lubricity.

EXAMPLE 10

A 1 weight percent solution of a partial hydrolyzate of

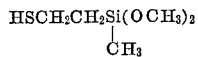

in toluene was wiped on polypropylene yarn of 210 denier and 35 count. This was then dried in the air and exposed for 10 minutes to an ultraviolet lamp at a distance of 3 inches.

Following this, a 10 weight percent solution of

in isopropanol was wiped on the yarn, and the yarn was dried at 260° F. for 5 minutes.

The yarn was then dyed with a 1% solution of a water-soluble dye (Cibalon red 2 GL), and dried for 5 minutes at 260° F.

The yarn was washed in an automatic washer for one cycle with Tide detergent and hot water. There was no fading of the color of the yarn.

The experiment was repeated, omitting the treatment with the mercaptosilane hydrolyzate, but including the treatment with the aminosilane.

The dye could be removed from this second sample of yarn by hand-washing with warm, soapy water.

EXAMPLE 11

(a) A thin film of

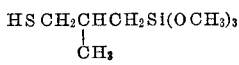

was wiped on a sheeet of polyethylene, which was then exposed for 10 minutes to an ultraviolet lamp at a distance of 3 inches.

A thin film of 3,3,3-trifluoropropyltrimethoxysilane was then applied to the treated polyethylene surface, and allowed to stand for a few minutes. The surface was then washed with acetone to remove unattached silanes and allowed to dry.

The contact angle of a drop of mineral oil on the treated polyethylene surface was 20°. This indicated moderate oleophobicity.

The contact angle of a drop of mineral oil on an untreated polyethylene surface was found to be 0°, indicating no oleophobicity.

The contact angle of a liquid drop on a surface is the angle between the surface and the side of the drop where it contacts the surface, and is a measure of the compatibility of the materials that make up the drop and the surface.

(b) The above experiment was repeated, replacing 3,3,3-trifluoropropyltrimethoxysilane with

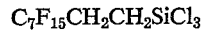

The contact angle of a drop of mineral oil on polyethylene treated in this manner was 45°, indicating strong hydrophobicity.

(c) A polyethylene container was treated in the manner of (b) above, and was found to be suitable for containing oils for a long period of time.

EXAMPLE 12

A thin film of

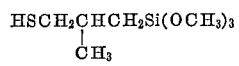

was wiped on a sheet of polyethylene, which was then exposed for 10 minutes to an ultraviolet lamp at a distance of 3 inches. Treated sheets of mercaptosilane-grafted polyethylene resulted.

A thin film of

was wiped on the treated polyethylene and dried.

To this there was applied a polyamide coating resin which is useful as a printing paste (Versamide 940). The adhesion of the resin to the coated polyethylene was excellent, with no adhesive failure under severe flex.

The experiment was repeated, omitting the mercaptosilane treatment, but including the treatment with the aminosilane.

The adhesion of the polyamide coating resin to the polyethylene was poor.

EXAMPLE 13

Two polyethylene sheets, treated with mercaptosilane as in Example 12, were coated with an aqueous dispersion of colloidal silica (a partial condensate of silicic acid), and were then allowed to dry. They were then washed in water to remove excess silica and dried again.

The sheets were placed on top of each other with their treated sides in contact, and a 125 g. weight was placed on top of both.

The upper sheet was then pulled laterally along the bottom sheet. 120 g. of force was required to start the sheets moving, indicating that the treated surfaces had a starting coefficient of friction of 0.96.

Untreated polyethylene sheets, when tested as above, began moving relative to each other at 65 g. of pull, showing that their starting coefficient of friction was 0.52.

The treated polyethylene sheets of Example 12 showed a coefficient of friction of 0.36 upon similar testing.

EXAMPLE 14

The mercaptosilane-treated polyethylene of Example 12 was treated with an ethylene-propylene polyglycol copolymer (Pluronic L 61) which was endblocked by reaction with

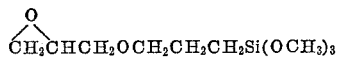

The terminal hydroxy group of the polyglycol reacts with the silane epoxy group to graft the molecules together.

This treated polyethylene was allowed to dry for 10 minutes, and the excess, unbonded material was washed off with isopropanol.

The dried polyethylene was tested for water-compatibility. The contact angle of a drop of water on the treated polyethylene surface was 0, indicating that the surface was hydrophilic.

Untreated polyethylene has a contact angle with water of 45°.

EXAMPLE 15

When a ring of butadiene-acrylonitrile rubber is coated with

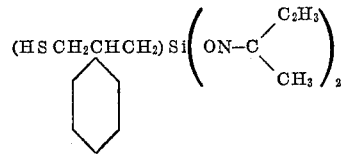

and dried in the presence of ultraviolet radiation, coating of the same ring with any of the following compounds, in the presence of gentle heating, will result in an oleophobic rubber ring which is resistant to swell in organic solvents:

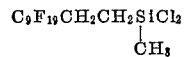

A partial hydrolyzate of $(C_4F_9CH_2CH_2)Si(OC_2H_5)_2$.

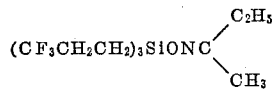

A partial hydrolyzate of

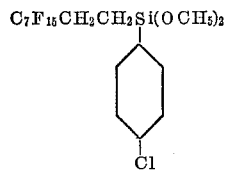

EXAMPLE 16

When a mixture of 100 parts by weight of molten poly of ultraviolet radiation with

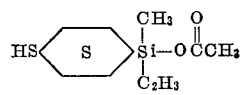

which is cocondensed with any of the following compounds, polystyrene strips which are receptive to water soluble dyes and inks are produced:

$(CH_3O)_3SiCH_2CH_2CH_2NH_2$

A partial hydrolyzate of

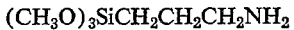

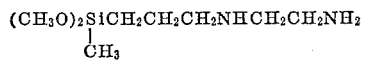

A partial hydrolyzate of

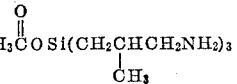

EXAMPLE 17

(a) To 2 samples of molten polypropylene there was added 0.1 and 0.5 weight percent, respectively, of $HSCH_2CH_2Si(OCH_3)_3$ The silane was dispersed in the ploypropylene, and the mixture was extruded into fibers. The fibers were immediately quenched in a 1.7 weight percent water solution of $NH_2CH_2CH_2NH(CH_2)_3Si(OCH_3)_3$.

The treated, dried fibers were washed in isopropanol, dried and dipped in a 1 weight percent water solution of Cibalon Red 2 GL dye. The fibers were then dried for 5 minutes at 260° F. to yield a richly-colored polypropylene.

The dyed fibers were washed for three automatic washer cycles with hot water and Tide detergent. The color of both sets of fibers was unfaded at the termination of this treatment.

(b) The above experiment was repeated using polypropylene without a mercaptoalkylsilane. The dyed fibers made from this material faded badly during the washing test.

EXAMPLE 18

The experiment of Example 18 (a) was repeated, using a molten polypropylene which contained 0.5 weight percent of a hydrolyzate of

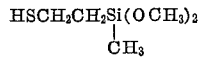

The same excellent results as above were achieved.

EXAMPLE 19

When a mixture of 100 parts by weight of molten polypropylene and one part of

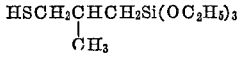

is extruded into fibers which are quenched in a 5 weight percent emulsion of colloidal silica, the resulting fibrous product exhibits excellent fastness to water-soluble dyes when they are treated shortly before dyeing with $NH_2CH_2CH_2CH_2Si(OCH_3)_3$

EXAMPLE 20

When strips of polystyrene are treated in the presence (ethylene-propylene) copolymer and one part by weight of

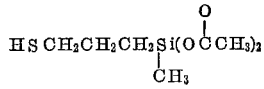

is extruded into fibers which are then dipped in a 20 weight percent water solution of a partial hydrolyzate of CH₃NHCH₂CHCH₂Si(NH₂)₂
CH₃

The resulting fibrous product is permanently dyeable with water-soluble dyes.

That which is claimed is:
1. The process of
   (1) extruding into fibers a molten composition of
      (a) 100 parts by weight of a vinylic polymer, and
      (b) from 0.01 to 1.4 parts by weight of an organosilicon compound selected from the group consisting of silanes of the formula $$(HSR'-)_m R_n SiX_{4-m-n}$$

and partial hydrolyzates thereof, where R is selected from the group consisting of monovalent hydrocarbon and halohydrocarbon radicals free of aliphatic unsaturation, R' is a divalent hydrocarbon radical free of aliphatic unsaturation, $m$ has an average value of 1 to 3, $n$ has an average value of 0 to 2, the sum of $m$ and $n$ being from 1 to 3, and X is selected from the group consisting of the hydroxyl group and hydrolyzable groups free of aliphatic unsaturation.
   (2) applying to said fibers a water dispersion containing from 0.1 to 50 weight percent of a priming composition selected from the group consisting of colloidal silica, a silane of the formula $$X_{4-m-n}Si(R''NHQ)_m$$
$$R_n$$

and partial hydrolyzates of said silane, where R'' is an alkylene radical of no more than 4 carbon atoms, Q is selected from the group consisting of hydrogen and —R''NH₂ groups.

2. The process of claim 1 where the priming composition is NH₂CH₂CH₂NHCH₂CH₂CH₂Si(OCH₃)₃.
3. The process of claim 1 where the priming composition is NH₂CH₂CH₂CH₂Si(OCH₃)₃.
4. The process of claim 1 where the vinylic polymer is a thermoplastic saturated vinylic polymer.
5. The process of claim 4 where the vinylic polymer is a hydrocarbon polymer.
6. The process of claim 4 where the hydrocarbon polymer is selected from the group consisting of polyethylene, polypropylene and copolymers thereof.

References Cited

UNITED STATES PATENTS

| | | | |
|---|---|---|---|
| 3,170,940 | 2/1965 | Johnston | 260—448.2 |
| 3,186,965 | 6/1965 | Plueddemann | 260—46.5 |
| 3,278,484 | 10/1966 | Tesoro | 260—46.5 |
| 3,312,669 | 4/1967 | Giordano | 260—79.1 |
| 3,317,461 | 5/1967 | Plueddemann | 260—46.5 |
| 3,512,915 | 5/1970 | Spier | 8—8 |

JAY H. WOO, Primary Examiner

U.S. Cl. X.R.

117—138.8, 161; 204—159.13; 260—79.5, 825, 949; 264—210, 211